S. M. FIREY.
Cider Mills and Presses Combined.
No. 154,235.          Patented Aug. 18, 1874.
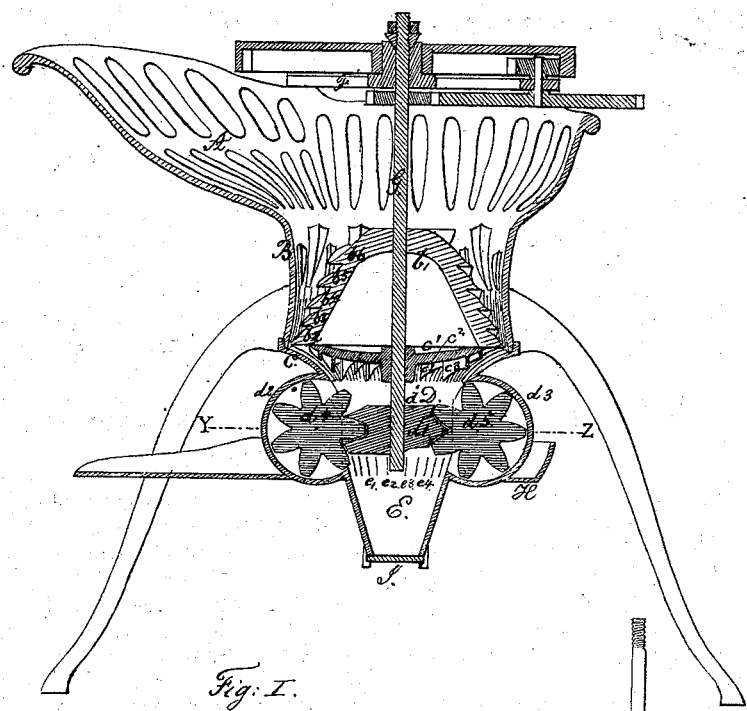
Fig. I.
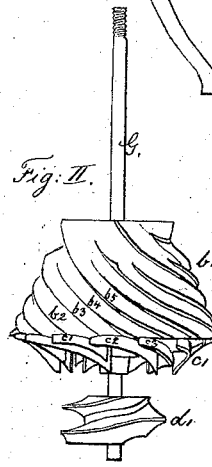
Fig. II.
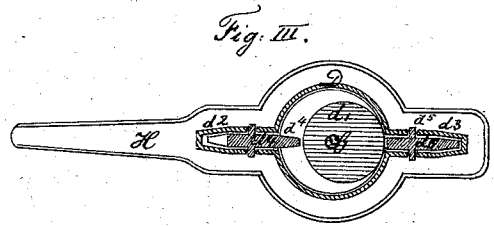
Fig. III.
WITNESSES:
John F. Neville
Henry Kraut
INVENTOR:
Samuel M. Firey
by Lpuzenberg & Co,
Attorneys.

UNITED STATES PATENT OFFICE.

SAMUEL M. FIREY, OF ST. LOUIS, MISSOURI.

IMPROVEMENT IN CIDER MILLS AND PRESSES COMBINED.

Specification forming part of Letters Patent No. 154,235, dated August 18, 1874; application filed January 21, 1874.

*To all whom it may concern:*

Be it known that I, SAMUEL M. FIREY, of St. Louis, in the county of St. Louis and State of Missouri, have invented a new and useful Cider Mill and Press Combined, of which the following is a specification, to wit:

The first part of my invention refers to the apparatus used for crushing the fruit, consisting of an upright chamber with circular sides depressing slightly to the middle. Within said chamber revolves a frustum, which, together with the chamber, is supplied with teeth, by which the fruit is reduced to small pieces. The teeth of the frustum are also down-bearing, so as to convey their contents toward the bottom of the chamber. Connecting with said chamber is another of the form of an inverted frustum, having a similar frustum revolving within, both supplied with teeth, the teeth of the latter being down-bearing to convey their contents to the press. The work is done with small regular expense of force, because of the regular and gradual maceration of the fruit, getting smaller by degrees, and because only a certain quantity of the fruit is admitted at a time to the process, and thus kept separate.

The second part of my invention consists in the application of a worm and wheels with large teeth to serve as scrapers, which oblige the crushed fruit to pass beneath the screw. By this I construct a pressing apparatus having regular feed and powerful pressure under a moderate expenditure of force.

The third part of my invention consists in combining with the above arrangements a funnel-shaped press-chamber which enables a gradually-increasing pressure of the material to be pressed without hindering the expulsion of the dry pomace. The juice escapes through narrow slits in the sides of the press-chamber into a canal encircling this chamber, while the pomace finds exit through the small lower end of the press-chamber, the combining of the macerating with the pressing apparatus, having the double effect of crushing the fruit and pressing out its juice at once, and in such a manner that both are simultaneously set into motion by a common shaft, the object being to construct a simple machine that may be operated by the least possible power.

The accompanying drawing shows in Figure I a vertical section of the entire apparatus; Fig. II, a front view of the shaft with the two frustums and the worm; Fig. III, a horizontal section in the direction from $y$ $z$ with vertical projection.

A is the hopper, open at its lower part, which connects with the crushing-chamber B, whose lower part connects with the feeding-chamber C, which empties into a cylinder, D, which discharges its contents into the funnel-shaped press-chamber E. The yoke F fixes the vertical shaft G, to which the dented frustums $b^1$ and $c^1$, as well as the worm $d^1$, are attached. $b^2$ $b^3$ $b^4$, &c., and $c^2$ $c^3$ $c^4$, &c., are the down-bearing teeth. The shaft G may be set in motion, either by direct appliances or by a combination of cog-wheels. The cog-wheels $d^4$ and $d^5$ or their equivalents, incased in their respective chambers $d^2$ and $d^3$, reach into the cylinder D, and serve as scrapers and evacuaters of the worm $d^1$. The openings $e^1$ $e^2$ $e^3$, &c., are the slits for the escape of the juice from the press-chamber E into the canal H.

The lower part of the press-chamber E may, at the beginning of the operation, be partially or entirely closed by a suitable contrivance, I, until the pressed mass may have acquired the desired density.

The apparatus may be constructed of such materials as combine durability and the quality of not being affected by the fruit-juice, or which may be easily so prepared that no injury may result.

The machine operates in the following manner: After the hopper A is filled with fruit and the shaft G is in motion, the frustum $b^1$ crushes the fruit in the chamber B and conducts it to chamber C, whence, after more crushing, the frustum $c^1$ carries it to the worm $d^1$, from which the cog-wheels $d^4$ and $d^5$, or their equivalents, scrape and press the same into the chamber E, whence the juice escapes through the slits $e^1$ $e^2$ $e^3$, &c., into the canal H, while the dry pomace is forced out through the lower part of the funnel-shaped chamber E. Now,

What I claim as my invention, and ask to be secured by Letters Patent, is—

1. The frustums $b^1$ and $c^1$, having the down-bearing teeth $b^2$ $b^3$, &c., and $c^2$ $c^3$, &c., substantially as and for the purpose set forth.

2. The worm $d^1$, arranged to rotate within the cylinder D, in combination with the cog-wheels $d^4$ and $d^5$, substantially as and for the purpose described.

3. The combination, with the chambers B, C, and E, of the shaft G, frustums $b^1$ $c^1$, and worm $d^1$, substantially as specified.

SAMUEL M. FIREY.

Witnesses:
JOHN F. NEVILLE,
HENRY KRAUT.